United States Patent [19]

Kühnel

[11] 4,218,731
[45] Aug. 19, 1980

[54] INVERTER COMPRISING AT LEAST TWO CONTROLLABLE LOAD THYRISTORS

[75] Inventor: Werner Kühnel, Uttenreuth, Fed. Rep. of Germany

[73] Assignee: Siemens Aktiengesellschaft, Berlin & Munich, Fed. Rep. of Germany

[21] Appl. No.: 915,366

[22] Filed: Jun. 14, 1978

[30] Foreign Application Priority Data

Jul. 14, 1977 [DE] Fed. Rep. of Germany ....... 2731938

[51] Int. Cl.² .......................................... H02M 7/515
[52] U.S. Cl. ...................................... 363/136; 363/57; 363/96
[58] Field of Search ...................... 363/27, 57, 96, 128, 363/135–139; 323/56, 24

[56] References Cited

U.S. PATENT DOCUMENTS

| | | | |
|---|---|---|---|
| 3,207,974 | 9/1965 | McMurray | 363/136 |
| 3,405,346 | 10/1968 | Krauthamer | 363/137 X |
| 3,656,047 | 4/1972 | Yarema et al. | 363/138 |
| 3,710,230 | 1/1973 | Venard | 363/138 |

FOREIGN PATENT DOCUMENTS 1613841 1/1971 Fed. Rep. of Germany .

Primary Examiner—J. D. Miller
Assistant Examiner—Peter S. Wong
Attorney, Agent, or Firm—Hill, Van Santen, Steadman, Chiara & Simpson

[57] ABSTRACT

One diode each is connected in antiparallel fashion to each load thyristor, said diode being a component of a commutation installation for the corresponding load thyristor. The commutation installation manifests an LC-series oscillatory circuit dimensioned for the specified load current and, for each load thyristor, a controllable commutation thyristor connected to a control circuit. Each commutation thyristor forms a closed circuit with the LC-series oscillatory circuit and its diode. One saturable choke each is connected in series with each thyristor and each diode. One RC-element each is connected in parallel with each thyristor and each diode, and saturation means are present for the chokes associated with the load thyristors. The inverter load may be the high voltage transformer of an x-ray generator.

2 Claims, 3 Drawing Figures

INVERTER COMPRISING AT LEAST TWO CONTROLLABLE LOAD THYRISTORS

BACKGROUND OF THE INVENTION

The invention relates to an inverter comprising at least two controllable load thyristors to which a control circuit is connected which alternately switches them on for the purpose of alternate connection of a load to the poles of a dc voltage source, wherein there is connected, in antiparallel fashion, with each load thyristor, one diode each which is a component of a commutation installation for the corresponding load thyristor, which commutation installation manifests an LC-series oscillatory (or resonant) circuit dimensioned for a specified load current, and which manifests, for each load thyristor, a controllable commutation thyristor connected to the control device, whereby each commutation thyristor forms a closed circuit with the LC-series oscillatory circuit and its diode, such that the energy of the LC-series oscillatory circuit, during commutation, in each instance swings over to a low-impedance commutation path which is free of the load and the dc voltage source.

SUMMARY OF THE INVENTION

The object underlying the invention consists in constructing an inverter of the type initially cited such that, in the case of inverter output pulses which are as rectangular in form as possible, an endangering of the load thyristors due to excessively high speeds of current increase, an excessively steep voltage increase at the load thyristors, as well as an excessively high power dissipation at the free-running diodes is prevented.

In accordance with the invention, this object is achieved by virtue of the fact that one saturable choke each is connected in series with each thyristor and each diode, that one RC-element each is connected in parallel with each thyristor and each diode, and that means for saturation are present for the chokes of the diodes and load thyristors, said means being controlled by the control circuit. In the inventive inverter, the chokes ensure a limitation of the current increase in the thyristors after their ignition, and prevent, in conjunction with the RC-members, an excessively steep voltage increase as well as a reverse current into the free-running diodes. In order that the chokes of the free-running diodes and of the load thyristors not produce any undesired voltage peaks in the output voltage of the inverter, they can be brought into the state of saturation in those time periods in which the latter undesired voltage peaks would occur.

The invention is explained in greater detail in the following on the basis of the sample embodiment illustrated in FIG. 2; and other objects, features and advantages will be apparent from this detailed disclosure and from the appended claims.

ON THE DRAWINGS

FIG. 1 shows a prior art inverter circuit wherein the load may comprise the primary winding of an x-ray tube high voltage transformer; and the inverter circuit per se corresponding identically to the second figure of U.S. Pat. No. 3,207,974 dated Sept. 21, 1965;

FIG. 2 illustrates the upper half of the left phase-module of the inverter according to FIG. 1; the lower half of this phase module, as well as the right phase module being correspondingly constructed; and FIG. 3 corresponds to one of the waveforms of part (d) of the thirteenth figure of said U.S. Pat. No. 3,207,974 and shows the time intervals during which the respective load thyristors of the left phase-module of the inverter according to FIGS. 1 and 2 are conducting.

DETAILED DESCRIPTION

Figure 1:
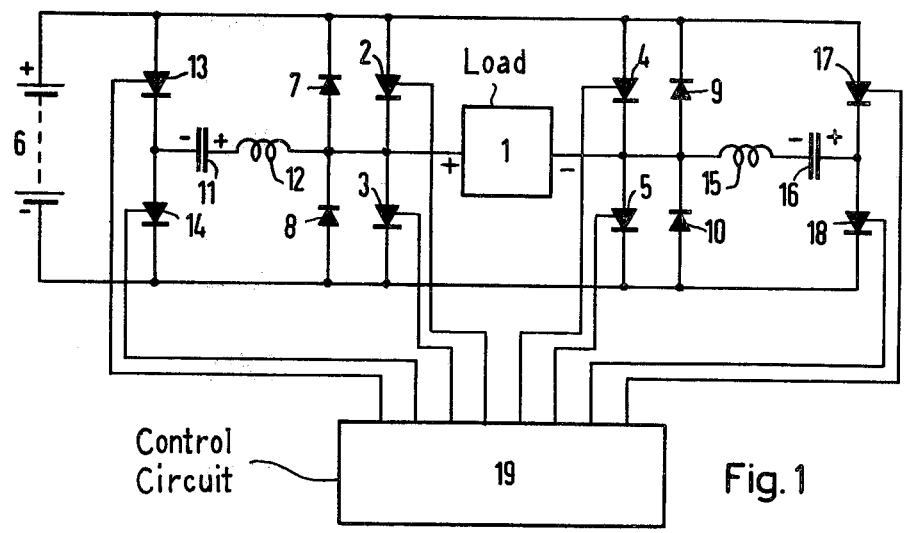

In FIG. 1, an inverter of the type described in the section headed Background of the Invention, e.g. known from the German Auslegeschrift No. 1,438,446, is illustrated the German Auslegeschrift corresponding to U.S. Pat. No. 3,207,974, and FIG. 1 corresponding identically to the second figure of said U.S. patent. It exhibits a load 1 which is disposed in the one diagonal of a bridge consisting of load thyristors 2 through 5. The other diagonal of this bridge is connected to a dc voltage source 6. One diode 7 through 10 is in each instance connected in an antiparallel fashion to each load thyristor 2 through 5, said respective diode being a component of a commutation installation for the corresponding load thyristor. In order to effect commutation of load thyristors 2 and 3, there is present an LC-series oscillatory circuit 11, 12, which is connected to the connection point of diodes 7 and 8, on the one hand, and to the connection point of two commutation thyristors 13 and 14, on the other hand. Analogously thereto, for the purpose of commutation of load thyristors 4 and 5, an LC-series oscillatory circuit 15, 16, is connected between the connection point of diodes 9 and 10 and the connection point of two commutation thyristors 17 and 18. The load thyristors 2 through 5 and the commutation thyristors 13, 14, 17, 18, are connected to a common control circuit 19.

In order to explain the method of operation of the inverter according to FIG. 1, let it be initially assumed that capacitors 11 and 16 of the LC-series oscillatory circuits 11, 12 and 15, 16 are charged with the indicated polarities and that the load thyristors 2 and 5 are ignited via the control circuit 19. The load 1 is thereby connected to the voltage source 6 with the indicated polarities. In order to reverse the polarity of the voltage at load 1, load thyristors 2 and 5 must be quenched (or extinguished) and the load thyristors 3 and 4 must be ignited (i.e. turned on). To this end, an ignition pulse is initially delivered to the commutation thyristors 13 and 18 by control circuit 19. Subsequent to ignition of the commutation thyristors 13 and 18, the capacitors 11 and 16 are reversed in charge; that is, first via load 1 and dc voltage source 6. The charge reversal current here replaces the current flowing through load thyristors 2 and 5. Since the load current through load 1 is constant, load thyristors 2 and 5 thus are extinguished load thyristor 2 being indicated as being conducting during the portion 2-1 of the waveform of FIG. 3. The symbol "t*" is utilized in FIG. 3 to indicate the time at which the current flowing through the load thyristor 2 becomes zero. Following the extinction of these thyristors, the charge reversal current flows further via diodes 7 and 10 until capacitors 11 and 16 are charged to a voltage having the opposite polarity of the voltage illustrated in FIG. 1. Following termination of the charge reversal operation, commutation thyristors 13 and 18 are extinguished.

Briefly prior to this, load thyristors 3 and 4 may be ignited by means of control circuit 19 through the delivery of ignition pulses. In order to extinguish (or quench)

load thyristors 3 and 4, commutation thyristors 14 and 17 are ignited, whereby the capacitors 11 and 16 again undergo a charge reversal corresponding to the above-described method of operation. In so doing, load thyristors 3, 4, are extinguished. Subsequently, load thyristors 2 and 5 are again ignited, etc. In the case of the inverter according to FIG. 1, the LC-series oscillatory circuits must be dimensioned corresponding to the load current, since they must, of course, take over the latter for a brief period. A control circuit particularly for use in controlling the operation of a bridge type inverter circuit such as illustrated in the second figure of said U.S. Pat. No. 3,207,974 is illustrated in the fourteenth figure of said U.S. patent, such control circuit thus being suitable for operation of the bridge type inverter circuit shown herein.

An area of application for an inverter according to FIG. 1 is e.g. x-ray technology. In this technology, an inverter according to FIG. 1 can serve the purpose of feeding the high voltage transformer of an x-ray generator. In this instance, the dc voltage source 6 may either be a mains (or power supply) rectifier or an accumulator. The feeding of the high voltage transformer can proceed with a frequency lying substantially above the mains (or power supply) frequency, such that the high voltage transformer, in comparison with x-ray generators directly fed by the mains supply, can be provided with a substantially more lightweight and smaller construction.

During operation of an inverter according to FIG. 1, there is the danger of the current in the load thyristors 2 through 5 increasing too rapidly after ignition, as a consequence of which these thyristors are endangered. In addition, the voltage at load thyristors 2 through 5 can also increase too rapidly, so that high demands are made of the permissible speed of voltage increase. Finally, a reverse current can occur in the free-running diodes 7 through 10 if the load thyristor opposite the respective free-running diode is ignited as long as the free-running diode is still in the conductive state. This reverse current would lead to an impermissibly large power dissipation at the free-running diode.

Figure 2:
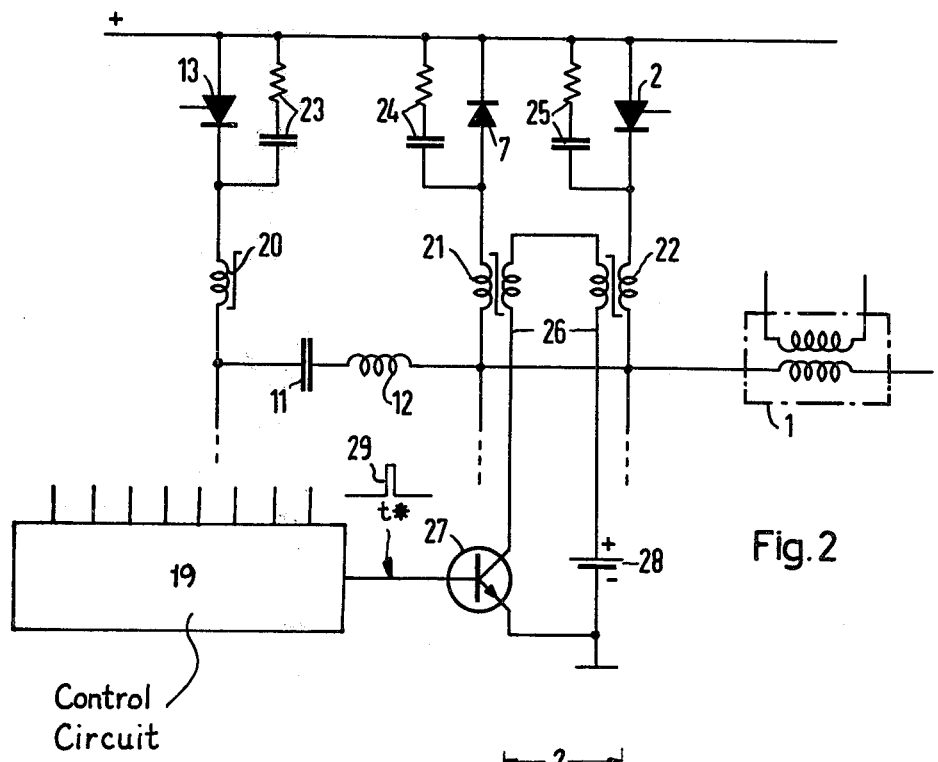

In FIG. 2, parts which are identical to the parts of the inverter according to FIG. 1 are designated with the same reference numerals. One saturable choke 20 through 22 is connected in series with each thyristor. In addition, one RC-member 23 through 25 each is connected in parallel with each thryistor and each diode. The chokes 20 through 22 limit the current increase in the thyristors and in the free-running diodes to permissible values. They further limit, in connection with the RC-elements 23 through 25, the voltage rise at the thyristors and the diodes to permissible values. They also prevent a reverse current from flowing into the free-running diodes. Thus, when the main thyristor opposite the respective free-running diode is ignited as long as the free-running diode is still in the conductive state, no reverse current flowing through the diode can lead to an impermissibly high power dissipation.

Figure 3:
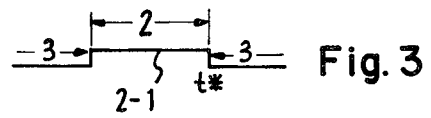

In the time interval in which the current through a load thyristor, e.g. through load thyristor 2, becomes zero as indicated at t* in FIG. 3, the corresponding free-running diode, e.g., 7, takes over the excess commutation current. In order that this operation not lead to inductive voltage drops at the saturable chokes 21 and 22, and hence to voltage peaks at load 1 (which, in the example according to FIG. 2, is a high voltage transformer for an x-ray generator), which voltage peaks are superimposed on the approximately rectangular (or square-wave) load voltage, an additional conductor 26 is threaded into the cores of chokes 21 and 22 and is energizable by means of a dc voltage source 28 under the control of a switching transistor 27. Upon turning on of switching transistor 27, chokes 21 and 22 are driven into saturation such that their inductance becomes negligibly small. The control of switching transistors 27 may proceed from the control circuit 19 in such a manner that chokes 21 and 22 are briefly driven into saturation if the current flowing through the corresponding load thyristor becomes zero. The brief current pulse indicated at 29, FIG. 2, delivered to the switching transistor 27 for this purpose entails no disadvantages with regard to the protective effect of the chokes 21 and 22, since this protective effect is not required at this time point, that is at time t*, FIGS. 2 and 3, when the current through the load thyristor 2 becomes zero. Naturally, however, it must be ensured that this current pulse 29 delivered to switching transistor 27 has died down by the time the next load thyristor is ignited.

FIG. 2 illustrates an inverter in accordance with the invention in a bridge circuit. However, the invention is also basically applicable in the case of an inverter wherein only one single phase component corresponding to FIG. 2 is present, if the dc voltage source 6 has a center tap to which the right end of the load 1 is connected.

It will be apparent that many modifications and variations may be effected without departing from the scope of the novel concepts and teachings of the present invention.

I claim as my invention:

1. An inverter comprising at least two controllable load thyristors to which a control circuit is connected which alternately switches them on for the purpose of alternate connection of a load to the poles of a dc voltage source, wherein one diode each is connected in antiparallel fashion to each load thyristor, said diode being a component of a commutation installation for the corresponding load thrysitor which commutation installation manifests an LC-series oscillatory circuit dimensioned for a specified load current, and a controllable commutation thyristor, connected to the control cirucit for each load thyristor, whereby each commutation thyristor forms a closed circuit with the LC-series oscillatory circuit and its diode, such that the energy of the LC-series oscillatory circuit, during commutation, in each instance swings over to a low-impedance commutation path which is free of the load and the dc voltage source, characterized in that one saturable choke each (e.g. 20, 21, 22) is connected in series with each thyristor (2 through 5, 13, 14, 17, 18) and each diode (7 through 10), that one RC-element each (e.g. 23, 24, 25) is connected in parallel with each thyristor (2 through 5, 13, 14, 17, 18) and each diode (7 through 10), and that saturation means (e.g. 26, 27, 28) are provided for the chokes (e.g. 21, 22) of the diodes (7 through 10) and load thyristors (2 through 5), said saturation means being controlled by the control circuit (19) for driving the chokes (e.g. 21, 22) of the diodes and load thyristors into saturation when the current flowing through the corresponding load thyristor (e.g. 2) becomes zero.

2. An inverter according to claim 1, characterized in that, in order to saturate the chokes (e.g. 21, 22) a conductor (26) is threaded into their cores, said conductor being connectable to a dc voltage source (28) via an electronic switch (27) controllable by the control circuit (19).

* * * * *